(12) United States Patent
Hancock et al.

(10) Patent No.: US 8,780,484 B2
(45) Date of Patent: Jul. 15, 2014

(54) TAPE FRICTION MEASUREMENT

(75) Inventors: Reed A. Hancock, Tucson, AZ (US); Randy C. Inch, Tucson, AZ (US); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/600,094

(22) Filed: Aug. 30, 2012

(65) Prior Publication Data

US 2014/0063640 A1  Mar. 6, 2014

(51) Int. Cl.
   *G11B 15/52* (2006.01)
   *G11B 15/46* (2006.01)

(52) U.S. Cl.
   USPC .................. 360/73.12; 360/73.09; 360/73.04

(58) Field of Classification Search
   None
   See application file for complete search history.

(56) References Cited

U.S. PATENT DOCUMENTS

| | | | |
|---|---|---|---|
| 5,901,008 A | 5/1999 | Nayak et al. | |
| 6,052,264 A * | 4/2000 | Curtis | 360/137 |
| 2002/0167746 A1 | 11/2002 | Burke et al. | |
| 2005/0237652 A1 | 10/2005 | Biskeborn | |
| 2007/0147893 A1 | 6/2007 | Nakatake et al. | |

FOREIGN PATENT DOCUMENTS

| | | |
|---|---|---|
| JP | 2001-147504 A | 5/2001 |
| JP | 2004-177332 A | 6/2004 |
| JP | 2008-081248 A | 4/2008 |

OTHER PUBLICATIONS

Nolan et al., "Effects of low-dye taping on plantar pressure pre and post exercise: an exploratory study," Apr. 21, 2009, BMC Musculoskeletal Disorders 2009, 10:40 doi: 10.1186/1471-2474-10-40, pp. 1-9.

* cited by examiner

*Primary Examiner* — Andrew L Sniezek
(74) *Attorney, Agent, or Firm* — Zilka-Kotab, PC

(57) ABSTRACT

A method according to one embodiment includes setting a default friction value to a predetermined value, determining whether a primary velocity is valid, determining a velocity error, determining whether the velocity error is in a predetermined range, accumulating the velocity error when the velocity error is determined to be in the predetermined range, repeating, until a time period has elapsed, each of: the determining the velocity error, the determining whether the velocity error is in the predetermined range, and the accumulating the velocity error when the velocity error is determined to be in the predetermined range, and calculating a new friction value based on the accumulated velocity error.

20 Claims, 10 Drawing Sheets

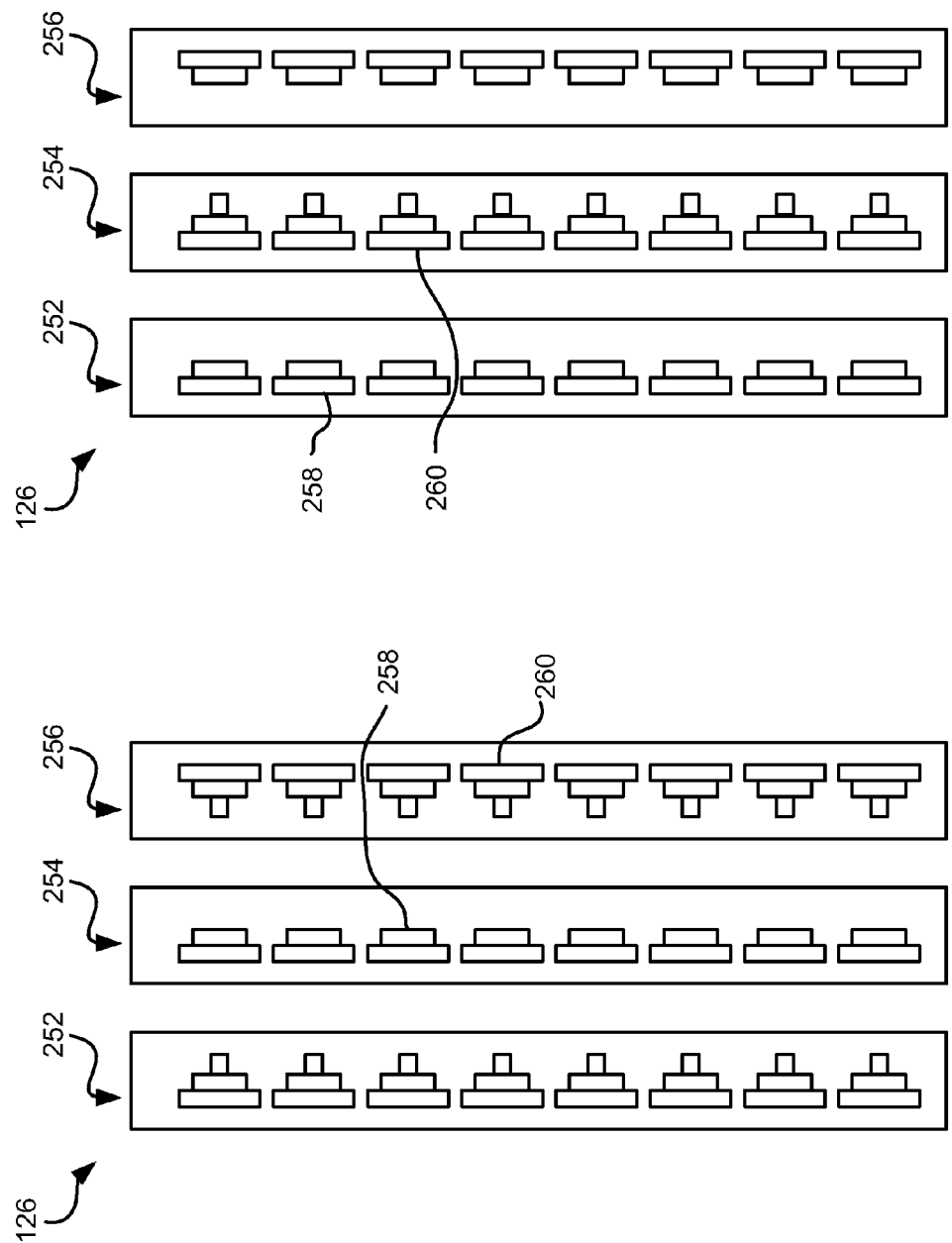

TAPE FRICTION MEASUREMENT

BACKGROUND

The present invention relates to data storage systems, and more particularly, this invention relates to providing a system, method and computer program product for improving magnetic tape friction measurements.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head and tape surface roughness are designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

BRIEF SUMMARY

In one embodiment, a method includes setting a default friction value to a predetermined value, determining whether a primary velocity is valid, determining a velocity error, determining whether the velocity error is in a predetermined range, accumulating the velocity error when the velocity error is determined to be in the predetermined range, repeating, until a time period has elapsed, each of: the determining the velocity error, the determining whether the velocity error is in the predetermined range, and the accumulating the velocity error when the velocity error is determined to be in the predetermined range, and calculating a new friction value based on the accumulated velocity error.

In another embodiment, a system includes a magnetic head, a drive mechanism for passing a magnetic medium over the magnetic head, and a controller electrically coupled to the magnetic head, wherein the controller is configured and/or programmable to: set a default friction value to a predetermined value, determine whether a primary velocity is valid, determine a velocity error, determine whether the velocity error is in a predetermined range, accumulate the velocity error when the velocity error is determined to be in the predetermined range, repeat, until a time period has elapsed, each of: the determining the velocity error, the determining whether the velocity error is in the predetermined range, and the accumulating the velocity error when the velocity error is determined to be in the predetermined range, and calculate a new friction value based on the accumulated velocity error.

In yet another embodiment, a computer program product includes a computer readable storage medium having program code embodied therewith, the program code readable/executable by a processor to: set a default friction value to a predetermined value, determine whether a primary velocity is valid, determine a velocity error, determine whether the velocity error is in a predetermined range, accumulate the velocity error when the velocity error is determined to be in the predetermined range, repeat, until a time period has elapsed, each of: the determining the velocity error, the determining whether the velocity error is in the predetermined range, and the accumulating the velocity error when the velocity error is determined to be in the predetermined range, and calculate a new friction value based on the accumulated velocity error.

In a further embodiment, a method includes setting a default friction value to a predetermined value, determining whether a primary velocity is valid, wherein the primary velocity is derived from one or more read back signals from one or more sensors reading a tape, determining a velocity error, determining whether the velocity error is in a predetermined range, accumulating the velocity error when the velocity error is determined to be in the predetermined range, repeating, until a time period has elapsed, each of: the determining whether the primary velocity is valid, the determining the velocity error, the determining whether the velocity error is in the predetermined range, and the accumulating the velocity error when the velocity error is determined to be in the predetermined range, resetting the accumulated velocity error to a default value when the primary velocity is not valid or when the velocity error is not within the predetermined range, calculating a new friction value based on the accumulated velocity error, wherein the new friction value (New_Friction) is calculated according to: New_Friction=Default_Friction+gain*(Verr_accum/sample), where Default_Friction is the predetermined default friction value, gain is a representation of current, Verr_accum is accumulated velocity error during a time period, and sample is a number of samples taken in the time period, wherein the new friction value is used to adjust a motor speed, and resetting the accumulated velocity error to the default value after calculating the new friction value.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

Figure 1A:
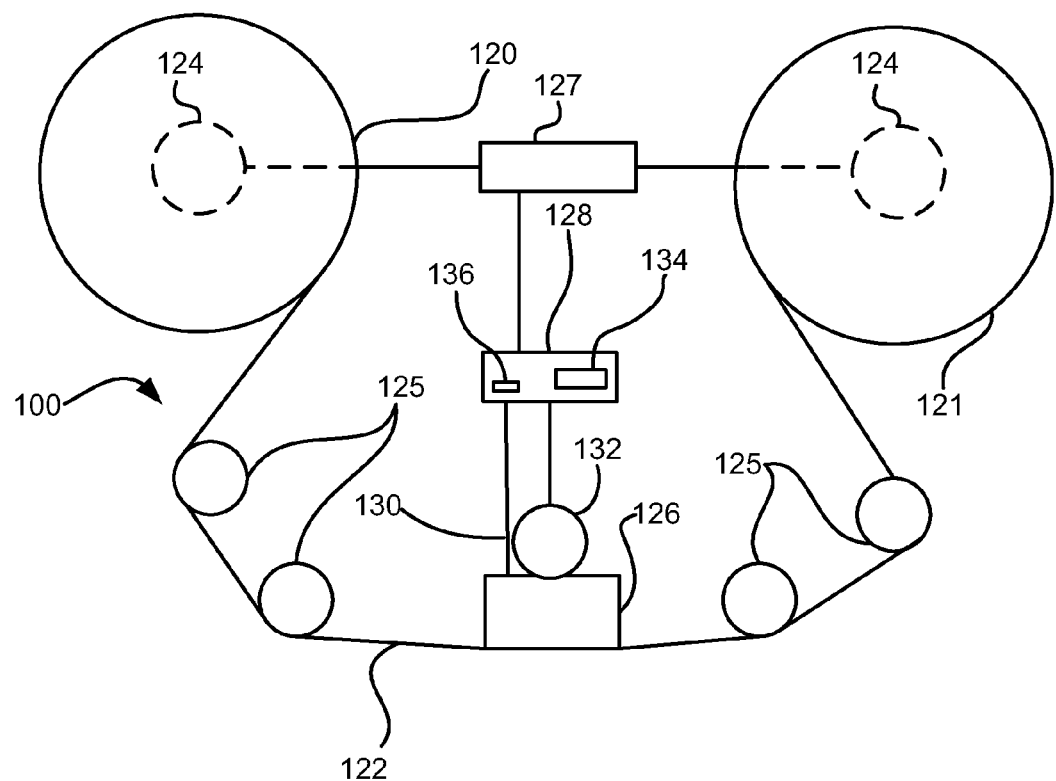
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of magnetic storage systems, as well as operation and/or component parts thereof.

In one general embodiment, a method includes setting a default friction value to a predetermined value, determining whether a primary velocity is valid, determining a velocity error, determining whether the velocity error is in a predetermined range, accumulating the velocity error when the velocity error is determined to be in the predetermined range, repeating, until a time period has elapsed, each of: the determining the velocity error, the determining whether the velocity error is in the predetermined range, and the accumulating the velocity error when the velocity error is determined to be in the predetermined range, and calculating a new friction value based on the accumulated velocity error.

In another general embodiment, a system includes a magnetic head, a drive mechanism for passing a magnetic medium over the magnetic head, and a controller electrically coupled to the magnetic head, wherein the controller is configured and/or programmable to: set a default friction value to a predetermined value, determine whether a primary velocity is valid, determine a velocity error, determine whether the velocity error is in a predetermined range, accumulate the velocity error when the velocity error is determined to be in the predetermined range, repeat, until a time period has elapsed, each of: the determining the velocity error, the determining whether the velocity error is in the predetermined range, and the accumulating the velocity error when the velocity error is determined to be in the predetermined range, and calculate a new friction value based on the accumulated velocity error.

In yet another general embodiment, a computer program product includes a computer readable storage medium having program code embodied therewith, the program code readable/executable by a processor to: set a default friction value to a predetermined value, determine whether a primary velocity is valid, determine a velocity error, determine whether the velocity error is in a predetermined range, accumulate the velocity error when the velocity error is determined to be in the predetermined range, repeat, until a time period has elapsed, each of: the determining the velocity error, the determining whether the velocity error is in the predetermined range, and the accumulating the velocity error when the velocity error is determined to be in the predetermined range, and calculate a new friction value based on the accumulated velocity error.

In a further general embodiment, a method includes setting a default friction value to a predetermined value, determining whether a primary velocity is valid, wherein the primary velocity is derived from one or more read back signals from one or more sensors reading a tape, determining a velocity error, determining whether the velocity error is in a predetermined range, accumulating the velocity error when the velocity error is determined to be in the predetermined range, repeating, until a time period has elapsed, each of: the determining whether the primary velocity is valid, the determining the velocity error, the determining whether the velocity error is in the predetermined range, and the accumulating the velocity error when the velocity error is determined to be in the predetermined range, resetting the accumulated velocity error to a default value when the primary velocity is not valid or when the velocity error is not within the predetermined range, calculating a new friction value based on the accumulated velocity error, wherein the new friction value (New_Friction) is calculated according to: New_Friction=Default_Friction+gain*(Verr_accum/sample), where Default_Friction is the predetermined default friction value, gain is a representation of current, Verr_accum is accumulated velocity error during a time period, and sample is a number of samples taken in the time period, wherein the new friction value is used to adjust a motor speed, and resetting the accumulated velocity error to the default value after calculating the new friction value.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) 124 to drive the tape supply cartridge 120 and the take-up reel 121 to move the tape 122 over a tape head 126 of any type. Such head may include an array of readers, writers, or both. The tape drive may also include a driver mechanism 127 to supply current to the drive motor(s) 124. The driver mechanism 127 may be coupled to a controller 128 and the drive the drive motor(s) 124 via a cable.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
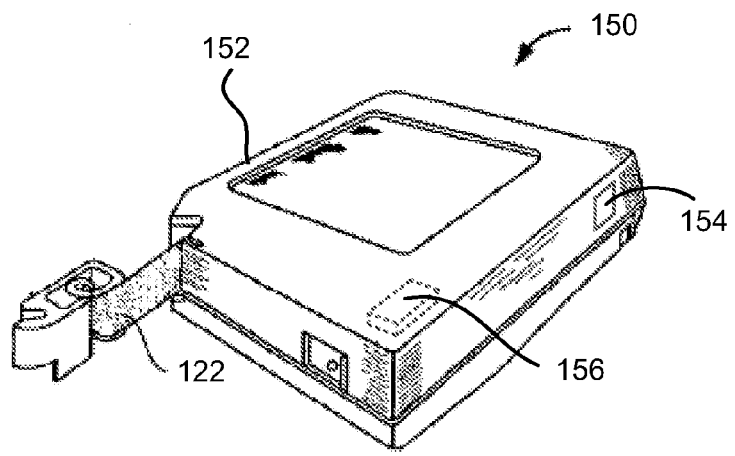
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
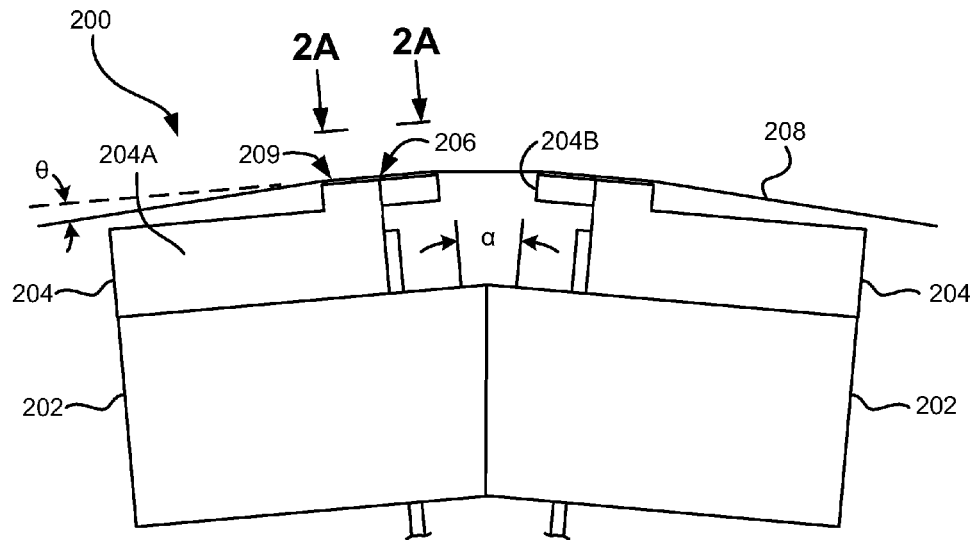
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
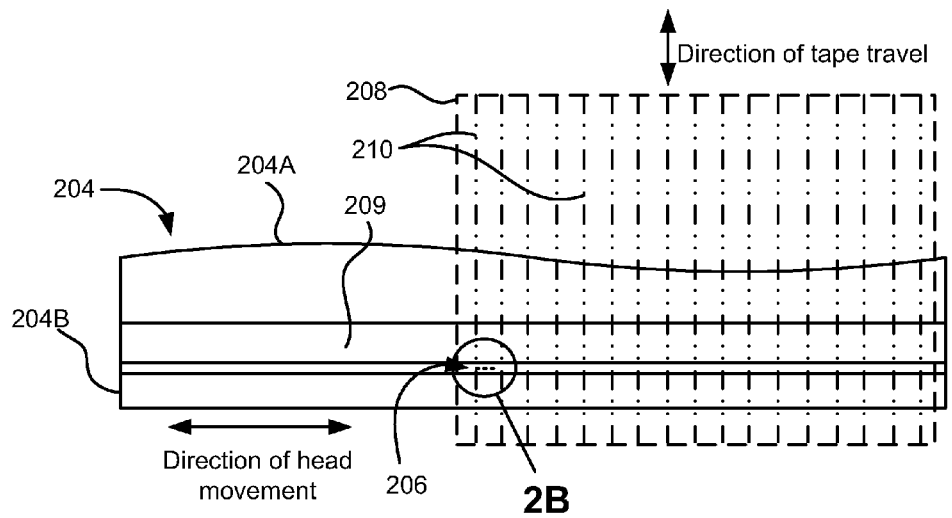
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
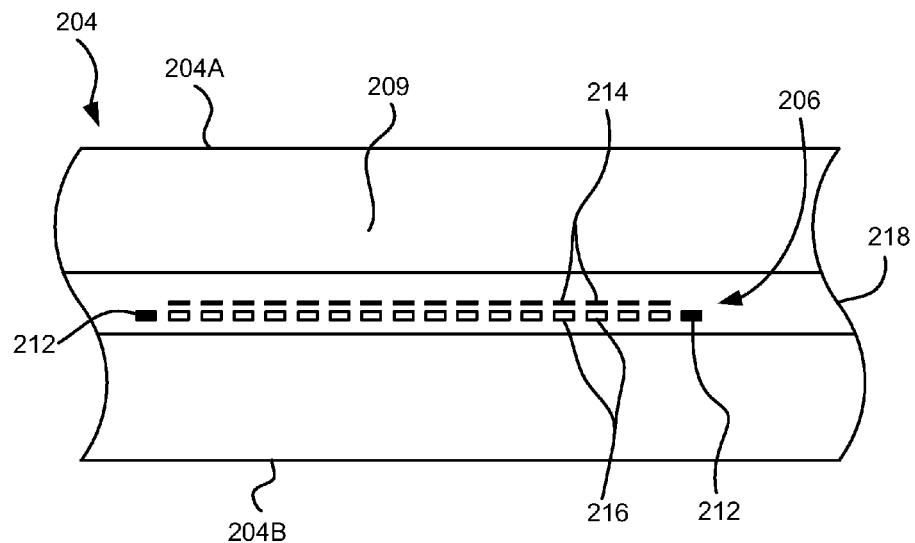
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
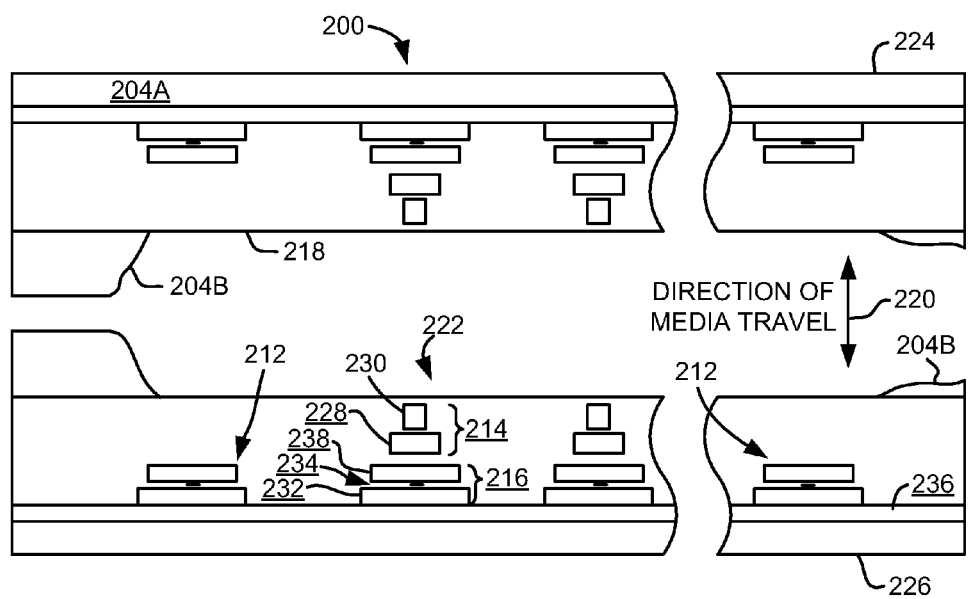
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
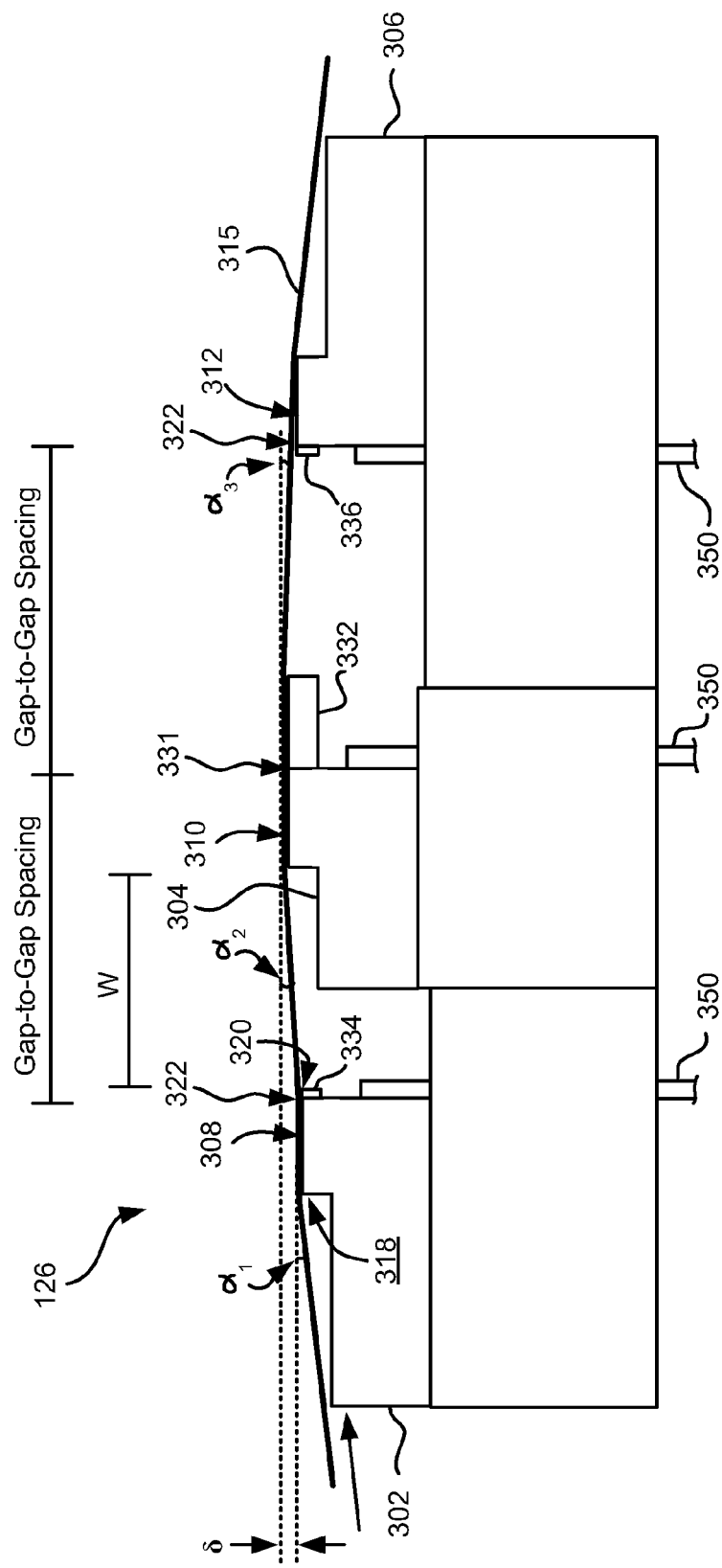
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules.

Also note that the outer modules 302, 306 will alternate as leading modules, depending on the direction of travel of the tape 315.

Figure 6:
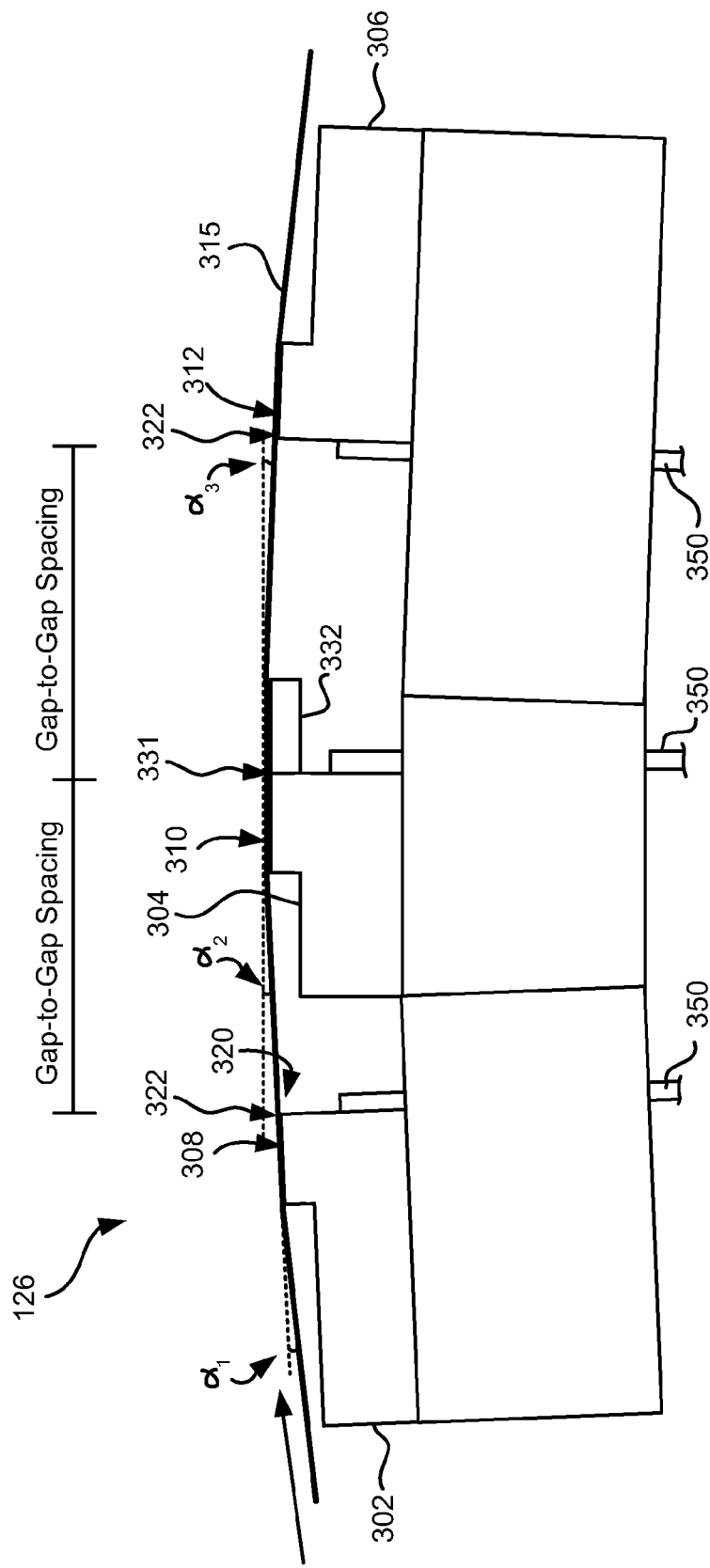
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
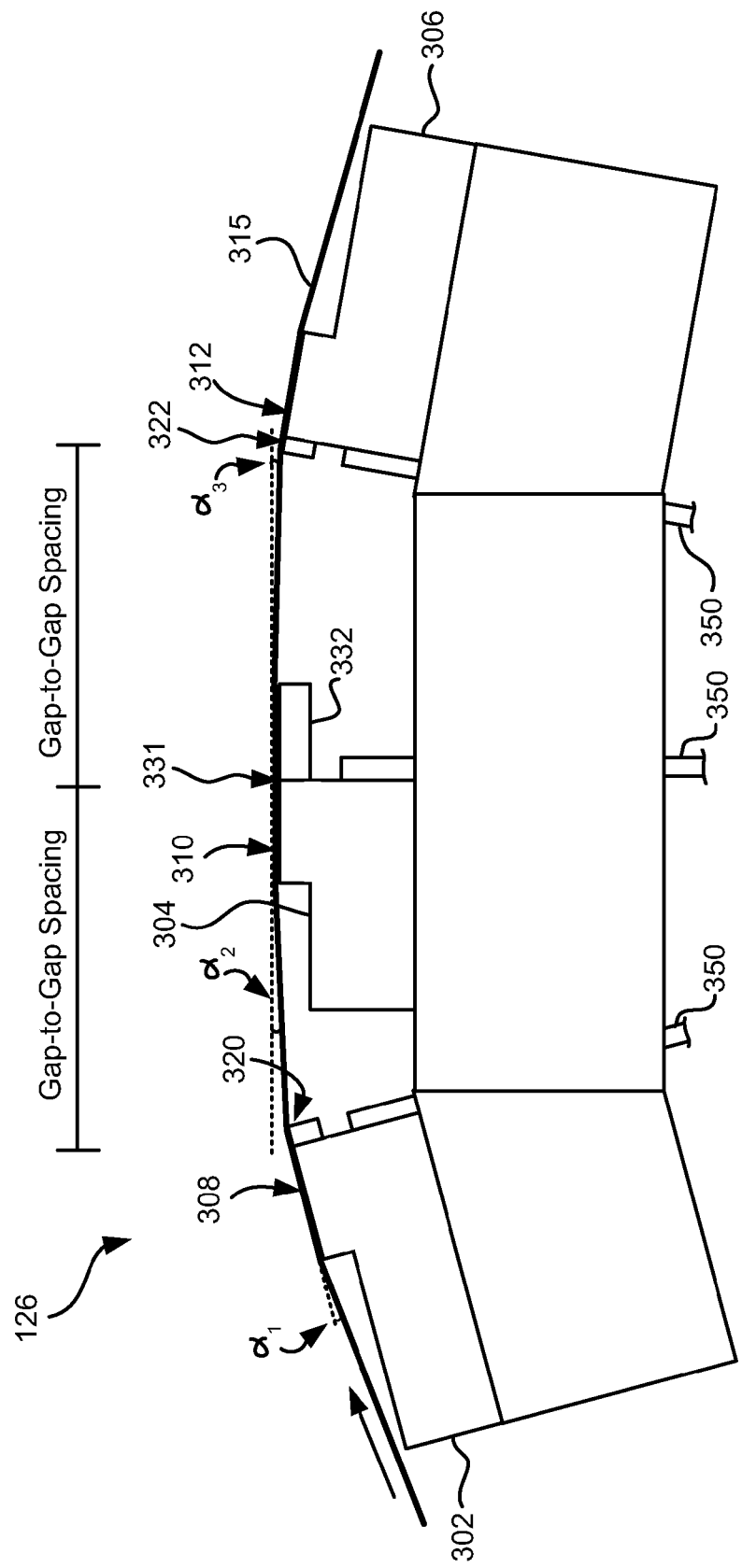
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

The advent of improved PES and velocity measurements allow velocity to be measured below 0.5 m/sec, where previously velocity was only able to be measured down to 1.5 m/sec. Tape velocity is typically derived from three different methods: primary velocity, secondary velocity and reel motor counts. A primary velocity (Vpri) may be derived from a servo pattern on a tape and is generally a very accurate velocity measurement. A secondary velocity (Vsec) may be derived from the motor pulse-width modulation (PWM) voltage. A tertiary velocity (Vtert) may also be derived from the reel motor counts, e.g., hall sensor counts.

Changes in the tape velocity often affect friction measurements and vice versa. A previous method of friction measurement accumulated a velocity error on a more or less continual basis and subsequently calculates a friction based on that accumulated error. However, such previous method is inaccurate because velocity may rapidly change during acceleration or deceleration, and where velocity is valid or invalid, the accumulated error may not accurately represent the velocity error that is a function of friction only. Consequently, previous friction measurements were subject to signals that cause erroneous tape friction values to be measured and used in the drive, resulting in such issues as abnormal acceleration rates due to current limiting. For example, where the friction is erroneously large, the friction share of allowable current may be disproportionately large, limiting the current available for acceleration and thus reducing the acceleration rate. This reduced acceleration rate may cause acceleration/deceleration time-outs to occur and tape motion issues.

Embodiments of the present invention overcome the aforementioned drawbacks by providing a system, method and computer program product for improving tape friction measurements by reducing and/or eliminating the erroneous friction values. These erroneous tape friction measurements may be eliminated in some embodiments by ensuring the accumulated velocity error is primarily or strictly a function of tape friction and not due to the velocity switching between valid and invalid or due to changing velocity from acceleration or deceleration. Preferably, a system, method and computer program product may include velocity error calculations in the friction measurements when the primary velocity is valid and when the velocity error is less than a predetermined value for a predetermined time period.

Figure 8:
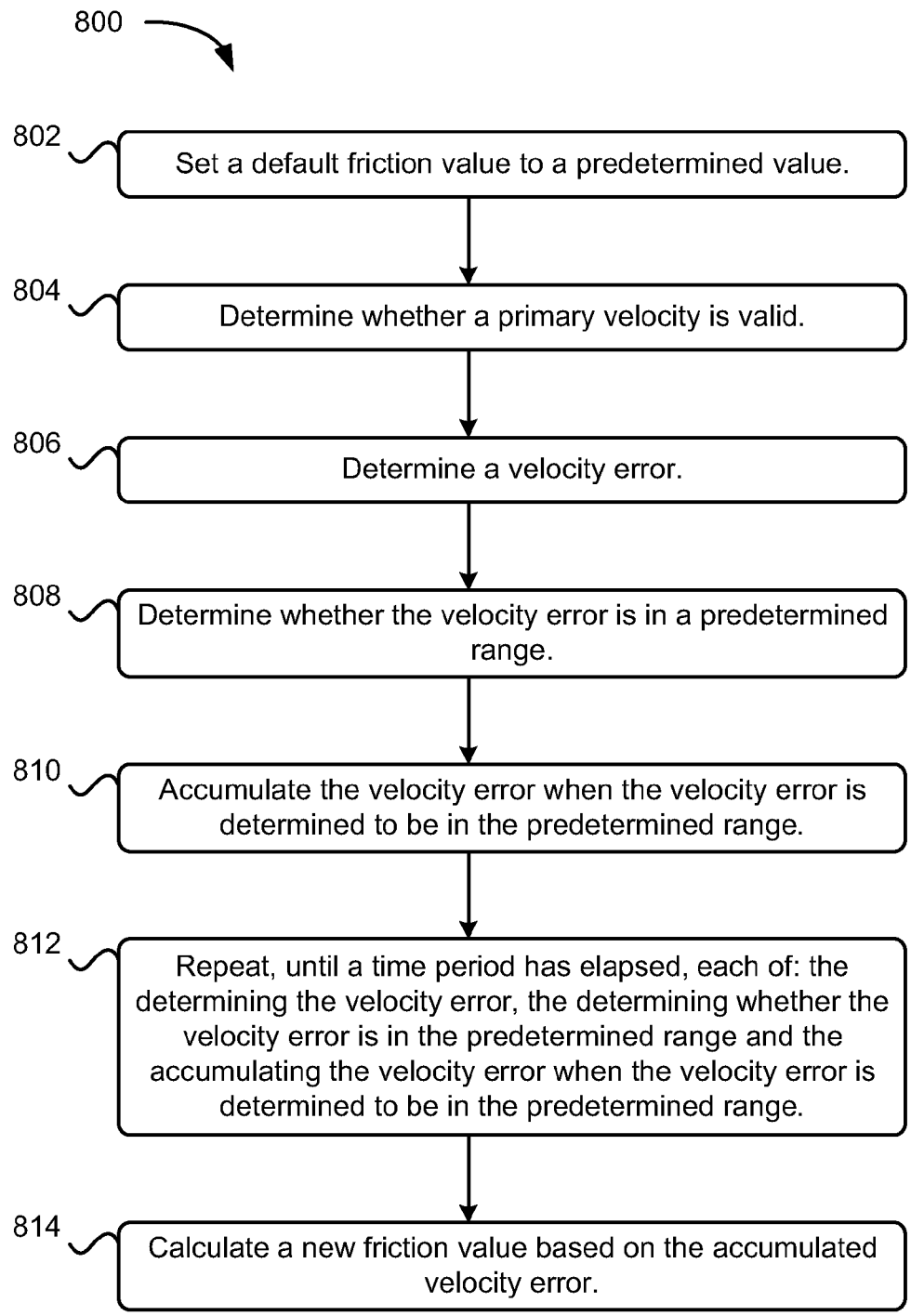
FIG. 8 is a flow diagram of a method according to one embodiment.

FIG. 8 shows a method 800 for measuring tape friction according to one illustrative embodiment. As an option, the present method 800 may be implemented in conjunction with features from any other embodiments listed herein, such as those shown in the other FIGS. Of course, however, this method 800 and others presented herein may be used in various applications and/or permutations, which may or may not be related to the illustrative embodiments listed herein. Further, the method 800 presented herein may be carried out in any desired environment. Moreover, more or less operations than those shown in FIG. 8 may be included in method 800, according to various embodiments.

As shown in FIG. 8 according to one approach, the method 800 includes setting a default friction value to a predetermined value. See operation 802. In one embodiment, the predetermined value may be a fixed default friction value that is always used, may be calculated in a previous iteration, may be based on known or estimated friction associated with a tape drive, such as friction arising from the spinning of the drive motors, movement of the roller bearings, movement of the tape across the roller bearings, movement of the tape across the tape head, etc., or any combination thereof.

The method 800 also includes determining whether a primary velocity is valid. See operation 804. In one embodiment, primary velocity is derived from one or more read back signals from one or more sensors reading a tape. As used herein, read back signals may include, but are not limited to, servo patterns, longitudinal positional (LPOS) information, etc. or other read back signals as would be understood by one having skill in the art upon reading the present disclosure.

Additionally, the method 800 includes determining a velocity error in operation 806. In one embodiment, the velocity error may be calculated based on a difference between the primary velocity and a reference velocity. As used herein, the reference velocity may correspond to the desired or target velocity of the tape, according to one approach. Further, the velocity error may be positive or negative according to another embodiment.

In operation 808, the method 800 includes determining whether the velocity error is in a predetermined range. The range may be chosen based on experimental evaluation to find an optimum value based on the drive, motors, tape velocities, etc. in a particular tape drive, as would be determinable by one skilled in the art without undue experimentation. In one embodiment, the predetermined range may be based on a range of values corresponding to a constant tape operating velocity. For example, the predetermined range may include values between ±0.0625 m/s, in one approach.

With continued reference to FIG. 8, the method includes accumulating the velocity error when the velocity error is determined to be in the predetermined range. See operation 810. In one embodiment, accumulating the velocity error may include averaging one or more velocity errors that are determined to be in the predetermined range.

In one embodiment, the method 800 may further comprise resetting the accumulated velocity error to a default value when the primary velocity is not valid. For example, in one approach, the accumulated velocity error may be reset to a default value of zero when the primary velocity is not valid.

In another embodiment, the method 800 may further comprise resetting the accumulated velocity error to a default value when the velocity error is not within the predetermined range.

Again, with reference to FIG. 8, the method 800 includes repeating, until a time period has elapsed, each of: the determining the velocity error, the determining whether the velocity error is in the predetermined range, and the accumulating the velocity error when the velocity error is determined to be in the predetermined range. See operation 812. As used herein, the time period, and/or any interval between periods, may be periodic, predetermined, varied, calculated, received, scaled based on some criteria such as the tape velocity, calculated based on some criteria such as the rate at which friction changes in a tape drive system, etc. For example, in one embodiment, the time period may be 1 second.

According to another embodiment, the method 800 may further comprise repeating the determining whether the primary velocity error is valid until a predetermined time period has elapsed. In yet another embodiment, the method 800 may also comprise resetting the accumulated velocity error to a default value when the primary velocity error is not valid.

As shown in FIG. 8, the method 800 also includes calculating a new friction value based on the accumulated velocity error. In one embodiment, the new friction value, New_Friction, may be calculated according to: New_Friction=Default_Friction+gain*(Verr_accum/sample), where Default_Friction is the predetermined default friction value which may be a fixed default friction value that is always used, may be a default friction value calculated in a previous iteration, etc.; gain is a representation of current (e.g. current as applied to the motor); Verr_accum is accumulated velocity error during a time period; and sample is a number of samples taken in the time period. For example, in one embodiment, velocity error may be accumulated every 800 microseconds during a 1 second time period, thus resulting in 1250 samples.

In another embodiment, the new friction value may be used to adjust a motor speed to compensate for the friction. In yet another embodiment, the method 800 may further comprise resetting the accumulated velocity error to a default value after calculating the new friction value.

Preferably, the drive is operating in cruise state (steady state velocity) before calculating the friction term. The friction term may also be calculated during acceleration and/or deceleration by applying an additional velocity error term that comes from the tolerances of the system during acceleration and deceleration that are not present during steady state velocity. Such term may be reflective of error introduced in the acceleration/deceleration current, and can be predetermined, read from a table, calculated on the fly, etc.

Figure 9:
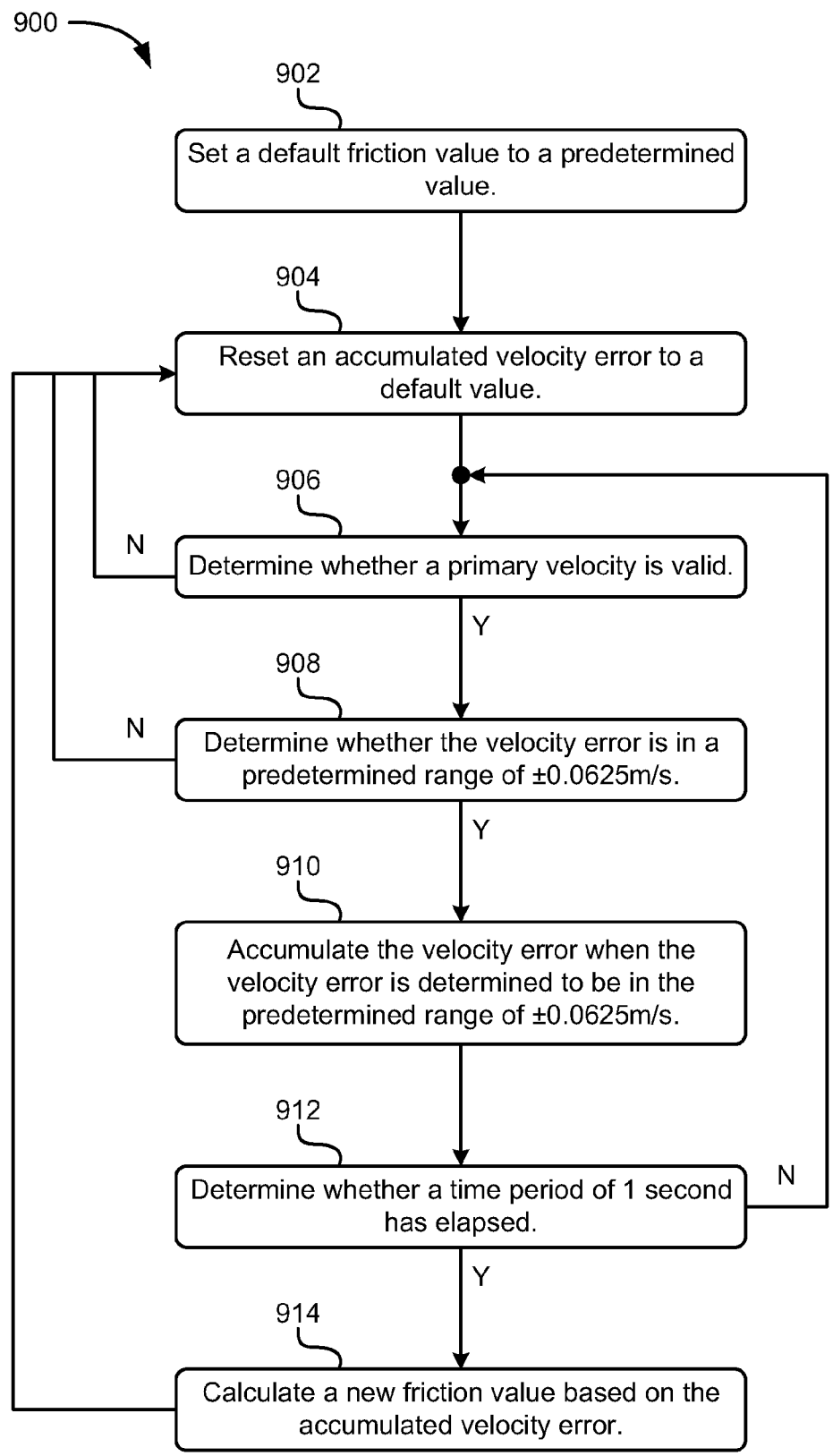
FIG. 9 is an exemplary decision tree of a method according to one embodiment.

FIG. 9 depicts an exemplary method 900, presented by way of example only, to illustrate one embodiment. As an option, the present method 900 may be implemented in conjunction with features from any other embodiments listed herein, such as those shown in the other FIGS. Of course, however, this method 900 and others presented herein may be used in various applications and/or permutations, which may or may not be related to the illustrative embodiments listed herein. Further, the method 900 presented herein may be carried out in any desired environment. Moreover, more or less operations than those shown in FIG. 9 may be included in method 900, according to various embodiments.

A shown in FIG. 9 according to one approach, a method 900 may include setting a default friction value to a predetermined value. See operation 902. The method 900 may also include resetting an accumulated velocity error to a default value. See operation 904.

Additionally, the method 900 may include determining whether a primary velocity is valid. See operation 906. If operation 906 results in a YES (Y) determination, the method 900 may further include determining whether the velocity error is in a predetermined range of ±0.0625 m/s in operation 908. In one embodiment, the velocity error may be calculated based on a difference between the primary velocity and a reference velocity. If operation 906 results in a NO (N) determination, the method 900 may loop back to operation 902 where the accumulated velocity error is reset to the default value. In one approach, the default value may equal zero.

With continued reference to FIG. 9, if the velocity error is determined to be in the predetermined range of ±0.0625 m/s (i.e. operation 908 results in a YES determination), the velocity error is accumulated as shown in operation 910. However, if the velocity is determined to fall outside the predetermined range of ±0.0625 m/s (i.e. operation 908 results in a N determination), the method 900 may loop back to operation 902 where the accumulated velocity error is reset to the default value.

Operation 912 involves determining whether a time period of 1 second has elapsed. If operation 912 results in a YES determination, a new friction value is calculated based on the accumulated velocity error. See operation 914. In one embodiment, the new friction value, New_Friction, may be calculated according to: New_Friction=Default_Friction+ gain*(Verr_accum/sample), where Default_Friction is the predetermined default friction value which may be a fixed default friction value that is always used, may be a default friction value calculated in a previous iteration, etc.; gain is a representation of current (e.g. current as applied to the motor); Verr_accum is accumulated velocity error during a time period; and sample is a number of samples taken in the time period.

If, however, operation 912 results in a NO determination, the method 900 may loop back to repeat operations 906, 908, 910 and 912.

This method or set of operations described in FIG. 9 may run during tape motion to continuously monitor and update the tape friction.

Figure 10:
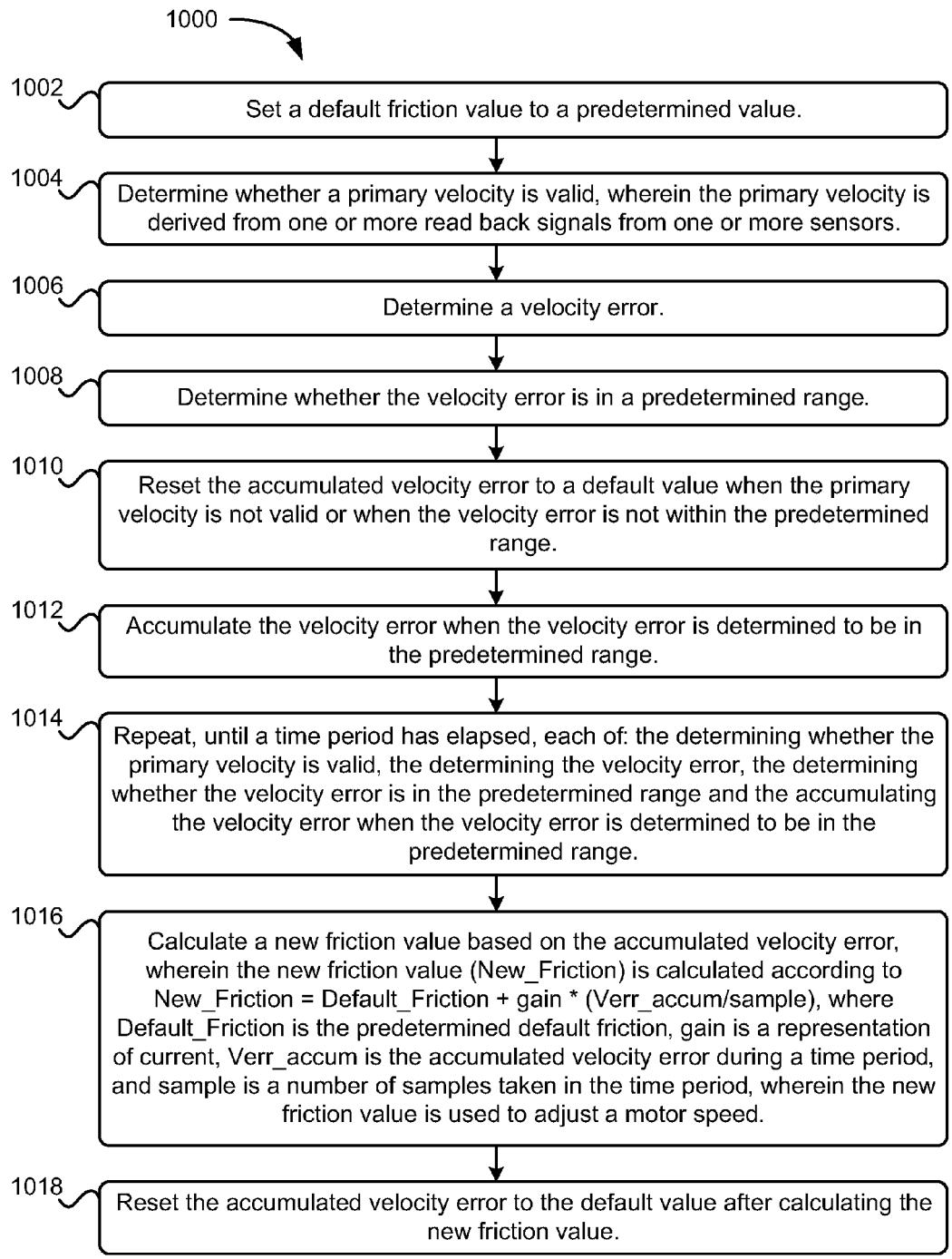
FIG. 10 is a flow diagram of a method according to one embodiment.

Referring now to FIG. 10, a method 1000 for measuring tape friction is shown according to another illustrative embodiment. As an option, the present method 1000 may be implemented in conjunction with features from any other embodiments listed herein, such as those shown in the other FIGS. Of course, however, this method 1000 and others presented herein may be used in various applications and/or permutations, which may or may not be related to the illustrative embodiments listed herein. Further, the method 1000 presented herein may be carried out in any desired environment. Moreover, more or less operations than those shown in FIG. 10 may be included in method 1000, according to various embodiments.

As shown in FIG. 10, the method 1000 includes setting a default friction value to a predetermined value. See operation 1002. In one embodiment, the predetermined value may be a fixed default friction value that is always used, may be calculated in a previous iteration, may be based on known or estimated friction associated with a tape drive, such as friction arising from the spinning of the drive motors, movement of the roller bearings, movement of the tape across the roller bearings, movement of the tape across the tape head, etc., or any combination thereof.

The method 1000 also includes determining whether a primary velocity is valid, wherein the primary velocity is derived from one or more read back signals from one or more sensors reading the tape. See operation 1004.

Additionally, the method 1000 includes determining a velocity error in operation 1006. In one embodiment, the velocity error may be calculated based on a difference between the primary velocity and a reference velocity.

The method 1000 further includes determining whether the velocity error is in a predetermined range. See operation 1008. The predetermined range may be chosen based on experimental evaluation to find an optimum value based on the drive, motors, tape velocities, etc. in a particular tape drive, as would be determinable by one skilled in the art without undue experimentation. In one embodiment, the predetermined range may be based on a range of values corresponding to a constant tape velocity. For example, the predetermined range may include values less than 0.0625 m/s, in one approach.

When the primary velocity is not valid or when the velocity error is not within the predetermined range, the velocity error is reset to a default error. See operation 1010. For example, in one approach, the accumulated velocity error may be reset to a default value of zero when the primary velocity is not valid or when the velocity error is not within the predetermined range. When the velocity error is determined to be in the predetermined range, the velocity error is accumulated. See operation 1012.

In operation 1014, the method 1000 includes repeating, until a time period has elapsed, each of: the determining whether the primary velocity is valid, the determining the velocity error, the determining whether the velocity error is in the predetermined range, and the accumulating the velocity error when the velocity error is determined to be in the predetermined range.

In one embodiment, a timer may time the time period. For example, in one approach, the timer may time out when the time period has elapsed. Once the time period has elapsed, the timer may then be reset, e.g. to zero, such that each of: the determining whether the primary velocity is valid, the determining the velocity error, the determining whether the velocity error is in the predetermined range, and the accumulating the velocity error when the velocity error is determined to be in the predetermined range, may be repeated until the time period has once again elapsed, in another approach. In yet another approach, once the time period has elapsed, each of: the determining whether the primary velocity is valid, the determining the velocity error, the determining whether the velocity error is in the predetermined range, and the accumulating the velocity error when the velocity error is determined to be in the predetermined range, may be repeated until a second time period has elapsed. In one approach, the time period and second time period may be the same or different.

In operation 1016, a new friction value is calculated based on the accumulated velocity error. In one embodiment, the new friction value, New_Friction, may be calculated according to: New-Friction=Default_Friction+gain*(Verr_accum/ sample), where Default Friction is the predetermined default friction value; gain is a representation of current; Verr_acum is the accumulated velocity error during a timer period; and sample is the number of samples taken in the time period. In addition, the new friction value is used to adjust a motor speed.

The method 1000 also includes resetting the accumulated velocity error to the default value after calculating the new friction value. See operation 1018.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
    setting a default friction value to a predetermined value;
    determining whether a primary velocity is valid;
    determining a velocity error;
    determining whether the velocity error is in a predetermined range;
    accumulating the velocity error when the velocity error is determined to be in the predetermined range;
    repeating, until a time period has elapsed, each of:
        the determining the velocity error,
        the determining whether the velocity error is in the predetermined range, and
        the accumulating the velocity error when the velocity error is determined to be in the predetermined range; and
    calculating a new friction value (New_Friction) based on the accumulated velocity error.

2. A method as recited in claim 1, wherein the primary velocity is derived from read back signals from one or more sensors reading a tape.

3. A method as recited in claim 1, further comprising resetting the accumulated velocity error to a default value when the primary velocity is not valid.

4. A method as recited in claim 1, further comprising resetting the accumulated velocity error to a default value when the velocity error is not within the predetermined range.

5. A method as recited in claim 1, further comprising resetting the accumulated velocity error to a delimit value after calculating the new friction value.

6. A method as recited in claim 1, wherein the new friction value is used to adjust a motor speed to compensate for the friction.

7. A method as recited in claim 1, further comprising repeating the determining whether the primary velocity error is valid until a predetermined time period has elapsed.

8. A method as recited in claim 7, further comprising resetting the accumulated velocity error to a default value when the primary velocity is not valid.

9. A method as recited in claim 1, wherein the new friction value
(New_friction) is calculated according to:
New_Friction=Default_Friction+gain*(Verr_accum/sample), where Default_Friction is the predetermined default friction value, gain is a representation of current, Verr_accum is accumulated velocity error during a time period, and sample is a number of samples taken in the time period.

10. A system, comprising:
a magnetic head;
a drive mechanism for passing a magnetic medium over the magnetic head; and
a controller electrically coupled to the magnetic head, wherein the controller is configured and/or programmable to:
set a default friction value to a predetermined value;
determine whether a primary velocity is valid;
determine a velocity error;
determine whether the velocity error is in a predetermined range;
accumulate the velocity error when the velocity error is determined to be in the predetermined range;
repeat, until a time period has elapsed, each of:
the determining the velocity error,
the determining whether the velocity error is in the predetermined range, and
the accumulating the velocity error when the velocity error is determined to be in the predetermined range; and
calculate a new friction value (New_Friction) based on the accumulated velocity error.

11. A system as recited in claim 10, wherein the primary velocity is derived. from read back signals from one or more sensors reading a tape.

12. A system as recited in claim 10, wherein the controller is configured and/or programmable to reset the accumulated velocity error to a default value when the primary velocity is not valid.

13. A system as recited in claim 10, wherein the controller is configured and/or programmable to reset the accumulated velocity error to a default value when the velocity error is not within the predetermined range.

14. A system as recited in claim 10, wherein the controller is configured and/or programmable to reset the accumulated velocity error to a default value after calculating the new friction value.

15. A system as recited in claim 10, wherein the new friction value is used to adjust a motor speed to compensate for the friction.

16. A system as recited in claim 10, wherein the controller is configured and/or programmable to repeat the determining whether the primary velocity is valid until a predetermined time period has elapsed.

17. A system as recited in claim 16, wherein the controller is configured and/or programmable to reset the accumulated velocity error to a. default value when the primary velocity is not valid.

18. A system as recited in claim 10, wherein the new friction value (New_Friction) is calculated according to:
New_Friction=Default_Friction+gain*(Verr_accum/sample), where Default_Friction is the predetermined default friction value, gain is a representation of current, Verr_accum is accumulated velocity error during a time period, and sample is a number of samples taken in the time period.

19. A computer program product, the computer program product comprising:
a non-transitory computer readable storage medium having program code embodied therewith, the program code readable/executable by a processor to:
set a default friction value to a predetermined value;
determine whether a primary velocity is valid;
determine a velocity error;
determine whether the velocity error is in a predetermined range;
accumulate the velocity error when the velocity error is determined to be in the predetermined range;
repeat, until a time period has elapsed, each of:
the determining the velocity error,
the determining whether the velocity error is in the predetermined range, and
the accumulating the velocity error when the velocity error is determined to be in
the predetermined range; and
calculate a new friction value based on the accumulated velocity error.

20. A method comprising,
setting a default friction value to a predetermined value;
determining whether a primary velocity is valid, wherein the primary velocity is derived from one or more read back signals from one or more sensors reading a tape;
determining a velocity error;
determining whether the velocity error is in a predetermined range;
accumulating the velocity error when the velocity error is determined to be in the predetermined range;
repeating, until a time period has elapsed, each of:
the determining whether the primary velocity is valid,
the determining the velocity error,
the determining whether the velocity error is in the predetermined range, and
the accumulating the velocity error when the velocity error is determined to be in the predetermined range;
resetting the accumulated velocity error to a default value when the primary velocity is not valid or when the velocity error is not within the predetermined range;
calculating a new friction value (New_Friction) based on the accumulated velocity error, wherein the new friction value (New_Friction) is calculated according to:

New_Friction=Default_Friction+gain*(Verr_accum/sample), where Default_Friction is the predetermined default friction value, gain is a representation of current, Verr_accum is accumulated velocity error during a time period, and sample is a number of samples taken in the time period, wherein the new friction value is used to adjust a motor speed; and resetting the accumulated velocity error to the default value after calculating the new friction value.

\* \* \* \* \*